No. 774,964. Patented November 15, 1904.

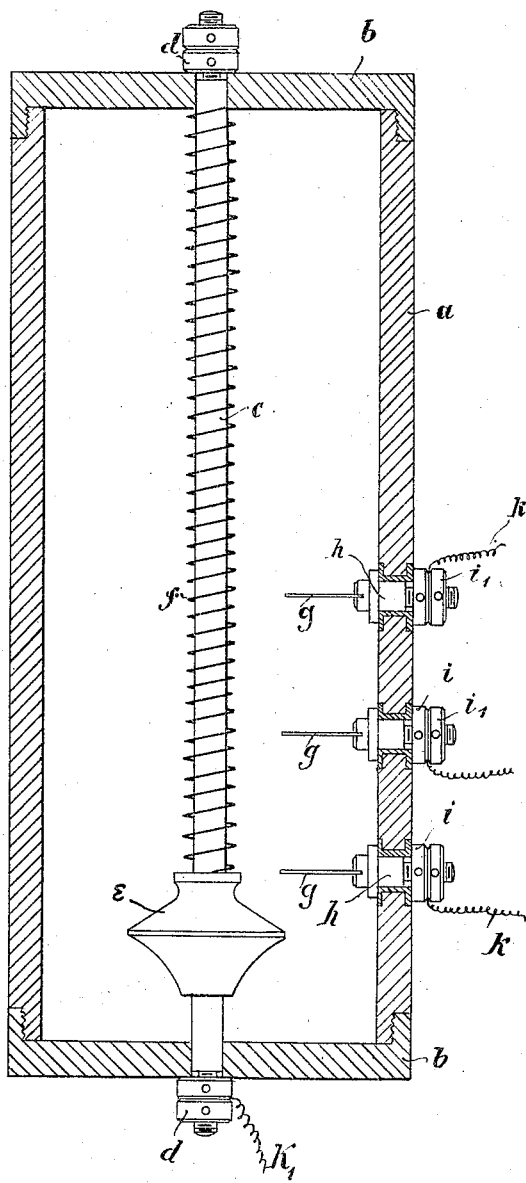

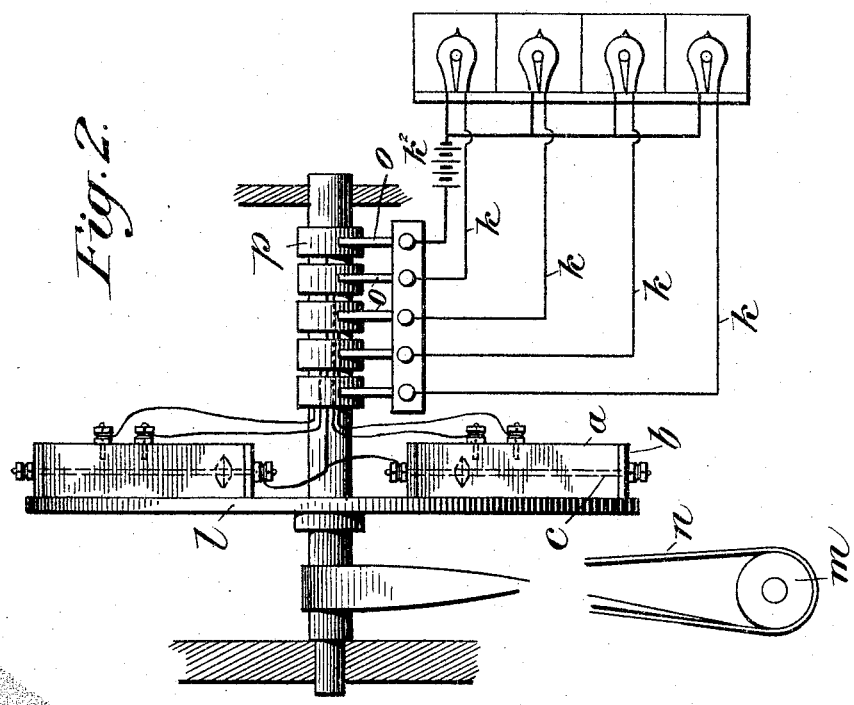
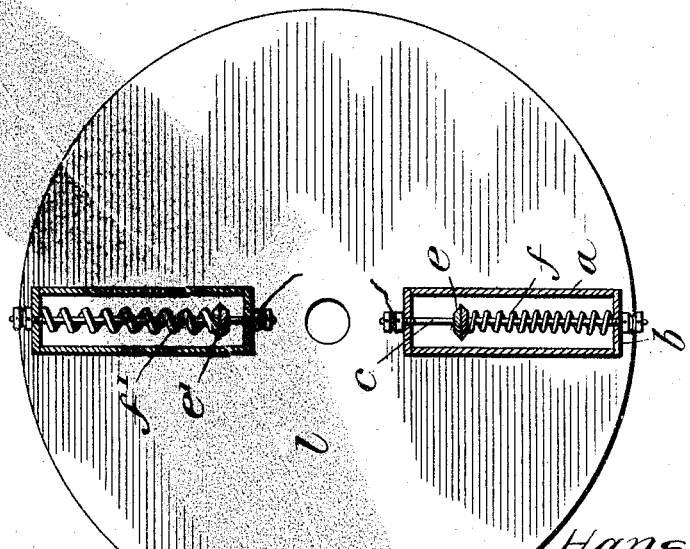

UNITED STATES PATENT OFFICE.

HANS DAHL, OF BERLIN, GERMANY.

AUTOMATIC ROTARY SPEED-INDICATOR.

SPECIFICATION forming part of Letters Patent No. 774,964, dated November 15, 1904.

Application filed June 20, 1901. Serial No. 65,351. (No model.)

*To all whom it may concern:*

Be it known that I, HANS DAHL, a subject of the Emperor of Germany, residing at Berlin, Germany, have invented certain new and useful Improvements in Speed-Indicators, of which the following is a specification.

The present invention relates to speed-indicators.

It has for one of its objects to provide for carriages or the like an improved speed-indicator which employs a body inclosed against dust or the like and movable outwardly from the axis of a rotating body, means being provided for indicating the various positions of the body on the rotating body.

Other objects and advantages will appear in the following description and will be particularly pointed out in the claims.

In the drawings, Figure 1 is a sectional view of a casing in which the sliding body is mounted. Fig. 2 is a diagrammatic view showing one of the ways in which the movement of the body may be indicated. Fig. 3 is a view of the rotating body with two of the casings shown thereon in section.

Referring more particularly to the drawings, $a$ indicates a casing closed at its ends by covers $b$, which are held thereon by means of rod $c$, preferably made of steel, and nuts $d$. A body $e$ in the form of a double cone slides on the rod $c$ and is held at one end of the casing $a$ by the spring $f$. The casing $a$ is secured to a rotating body $l$, so that the rod $c$ is radially disposed to the axis of the rotating body, and the sliding body is held near the said axis. It is evident that when the body $l$ is rotated by the shaft $m$ and belt $n$ or other means the sliding body will be thrown by centrifugal force outwardly from the axis. Therefore this movement is utilized for indicating the speed of the rotating body by connecting the steel rod $c$ with one of the poles of battery $k^2$ by means of conductor $k'$. This makes the sliding body $e$ a contact, and as it moves along the rod $c$ it first engages with the nearest contact $g$ and, as the speed increases, with the remainder of said contacts. These contacts $g$ consist of plate-springs and are secured in insulated blocks $h$ by means of nuts $i$, and second nuts $i'$ are employed to clamp the conductors $k$ between them. Connected in circuit with the wires $k$ is an indicator, which may be of any form, the one shown being a series of lights, each one in circuit with one of the contacts $g$ by means of wire $k$ and brushes $o$, which engage with contact-rings $p$ on the shaft of the rotating body $l$, one light being lighted every time the sliding body $e$ contacts with one of the contacts $g$.

To prevent the necessity of using too large a rotating body $l$, it is preferred to employ two sliding bodies, one of which, $e'$, has opposing its movement a spring $f'$ of greater strength than the spring $f$. The contact $e$ first engages with all its contacts $g$, and then the contact $e'$ comes into action.

Various changes in form, proportion, and minor details may be made within the scope of the appended claims without departing from the spirit of my invention.

What I claim as my invention is—

1. The combination with a rotating body, of a water and dust proof casing mounted on and rotating with the rotating body, a rod mounted in the casing and connected with an electric circuit, a body mounted to move freely on the rod, spring means opposing the movement of the body, and electrical means mounted within this casing and adapted to be engaged by the second body.

2. The combination with the rotating body, of a water and dust proof casing mounted on and rotating with the rotating body, a rod mounted in the casing and connected with an electric circuit, a body mounted to slide freely on the rod, a spring opposing the movement of the sliding body, and a plurality of contacts mounted within the casing and adapted to be engaged by the sliding body.

3. In a speed-indicator, the combination with a rotating body, of a plurality of bodies rotating with and moving outwardly from the axis of the rotating body by centrifugal force, a plurality of springs of different strength respectively opposing the movements of the plurality of bodies, and electrical means for indicating a plurality of the places of each of the bodies according to the speed of rotation.

4. In a speed-indicator, the combination with a rotating body, of a plurality of bodies rotating with and moving outwardly from the axis of the rotating body by centrifugal force, a plurality of springs respectively opposing the movements of the plurality of bodies, and electrical means for indicating a plurality of the places of each of the bodies according to the speed of rotation.

In witness whereof I hereunto subscribe my signature in presence of two witnesses.

HANS DAHL.

Witnesses:
S. HERZBERG,
HENRY HASPER.